United States Patent [19]
Fienup et al.

[11] 3,957,353
[45] May 18, 1976

[54] MULTIEMULSION TRANSPARENCY PROVIDING SEPARATE PHASE AND AMPLITUDE CONTROL

[75] Inventors: James R. Fienup, Stanford; David Chau-Kwong Chu, Woodside, both of Calif.

[73] Assignee: The Board of Trustees of the Leland Stanford University, Stanford, Calif.

[22] Filed: Mar. 8, 1974

[21] Appl. No.: 449,448

[52] U.S. Cl. .......................... 350/162 SF; 96/27 H; 350/3.5; 350/314
[51] Int. Cl.² ..................... G02B 5/20; G02B 27/00
[58] Field of Search ............... 350/3.5, 162 SF, 314; 96/27 H; 178/6.7 R, 6.7 A

[56] References Cited
UNITED STATES PATENTS

| | | | |
|---|---|---|---|
| 3,045,530 | 7/1962 | Tsujiuchi | 350/162 SF |
| 3,442,566 | 5/1969 | Forward | 350/3.5 |

OTHER PUBLICATIONS

Ransom, *Applied Optics*, Vol. 11, No. 11, Nov. 1972, pp. 2554–2561.
Marathay, *Jour. of the Optical Society of America*, Vol. 59, No. 6, June 1969, pp. 748–752.
Vanderlugt, *Optica Acta*, Vol. 15, No. 1, Feb. 1968, pp. 1–33.
Meyer et al., *Jour. of the Optical Society of America*, Vol. 57, No. 11, Nov. 1967, pp. 1388–1389.

*Primary Examiner*—Ronald J. Stern
*Attorney, Agent, or Firm*—Flehr, Hohbach, Test

[57] ABSTRACT

Method and apparatus for making a hologram that controls both the amplitude and the phase of a reconstructing beam of light at each point on the surface of the hologram. The hologram is a transparency made from a conventional, color reversal photographic film that has multiple emulsion layers that are each selectively photosensitive to light of different wavelengths. The desired image to be produced from the hologram is initially processed into a matrix of Fourier transformed amplitude coefficients and a matrix of Fourier transformed phase coefficients. The hologram is made by first exposing the photographic film to an illumination pattern of the Fourier amplitude coefficients using light having a spectrum to which one of the emulsions is selectively photosensitive. The film is next exposed to an illumination pattern of the Fourier phase coefficients using light having a wavelength to which another emulsion of the film is selectively photosensitive. Two separate exposures are made on the film, and each exposure photographically records a separate set of Fourier transformed data describing the image to be produced. After the transparency is developed, the desired image is reconstructed by illuminating the transparency with a coherent beam of light. One emulsion layer on the film controls the amplitude transmittance according to the Fourier amplitude data and another emulsion layer controls the phase of the reconstructing beam of light passing through the transparency in accordance with the recorded Fourier phase data. A full color holographic image is obtainable by constructing three separate holograms, reconstructing each hologram with a different primary color and combining the three primary colors together to form one image.

27 Claims, 4 Drawing Figures

MULTIEMULSION TRANSPARENCY PROVIDING SEPARATE PHASE AND AMPLITUDE CONTROL

BACKGROUND OF THE INVENTION

1. Field of the Invention

This invention relates to holography and, more particularly, to holographic transparencies that control both amplitude and phase transmittance.

2. Description of the Prior Art

In general, a hologram is a photographic recording of the interference pattern formed by an object wave and a reference wave. The object wave is usually a complex wave created by reflecting a beam of coherent light off of the object being recorded. The reference wave is usually a beam of coherent light coming directly from the same source. The object wave and the reference wave are combined together to generate an interference pattern that is recorded on a photographic transparency, called a hologram. To reconstruct an image of the original object, the hologram is illuminated with a reconstructing beam of light having the same characteristics as the phase coherent, reference wave used in forming the hologram.

The term "reconstruct the image" as used throughout the specification and claims of this case means that the hologram is illuminated and an image appears and includes the formation of an image of an object that does not physically exist and also includes the modulation of an incident wave in an arbitrary but controlled manner, without necessarily forming a specific image.

Holograms can also be synthesized by using a digital computer, and the object being recorded on the hologram need not physically exist. A mathematical model of the object is usually made in the form of a matrix array of phase coherent point sources. Next, the wave front mathematically produced by the object and incident on a plane in space, called the hologram plane, is calculated. The results of the calculation are optically displayed and the complex pattern thus generated is photographically recorded on a photosensitive film. When illuminated by a reconstructing beam in the conventional manner, the photosensitive film will modulate the wave so that the wave front will emerge from the hologram exactly as though it came from the object.

Heretofore, the major problem in making computer synthesized holograms was forming a transparency that could control both the amplitude and the phase of a reconstructing wave at each point on the surface of the hologram. One solution to this problem has been to make a transparency that controls just the amplitude transmittance of the reconstructing light and a separate transparency that controls just the phase of the reconstructing light. Thereafter, the two transparencies are mounted together to form a sandwich. Unfortunately, however, the alignment between the two transparencies is so critical that so far only crude patterns have been able to be encoded and holographically reconstructed.

Another well known technique for controlling the amplitude and phase of a computer generated hologram is known as the detour-phase binary hologram. In this technique the hologram is divided into a plurality of small cells each representing a complex Fourier coefficient. Each cell contains an aperture with its area related to the amplitude transmittance and its position with respect to the boundaries of the cell related to the phase of the Fourier coefficient. When a plurality of these cells is illuminated, the desired image is obtained off-axis in the first defraction order.

Although the detour-phase binary hologram requires only one transparency to control both amplitude and phase transmittance, the ultimate complexity of this type of hologram is limited in terms of its maximum space-bandwidth product. In order to minimize the amplitude and the phase quantization error, each Fourier coefficient, or cell, must be encoded into a large number of subcells. Each subcell on the transparency is exposed individually by illumination from a separate display resolution element located in an optical display device such as a cathode-ray tube. Since all of the display devices have only a finite number of display resolution elements available, the ultimate complexity of the hologram in terms of the maximum number of Fourier coefficients encodable is limited by the physical characteristics of the optical display device.

A further problem with binary detour-phase holograms is the quantization noise originating from quantizing the amplitude and phase valves in each cell on the hologram. An additional limitation of the binary detour-phase hologram is the limited lighting efficiency obtainable for the image. Since the desired image appears in but one of a plurality of diffraction orders, the light diffracted to the image is only a small fraction of the total illumination incident on the hologram. Moreover, a further problem with binary detour-phase holograms is the limitation of the maximum size of an object that can be spatially filtered. Since the binary detour-phase hologram generates spurious images, these images will overlap onto the desired image when an object is reconstructed that is too large for the system.

Another well known optical transparency for reconstructing light beams is called a kinoform. The kinoform is an optical transparency in which the amplitude data is approximated by a constant factor and only the phase data is recorded on the transparency. The Fourier transformed amplitude data is discarded on the assumption that only the phase information contained in the wave front scattered from an object is required for a faithful image of the scattering object. Since the amplitude information about the wave front is not preserved, a kinoform is not technically a hologram. A further description of a kinoform technique can be found in U.S. Pat. No. 3,606,515, entitled "Method of Manufacturing Wave Shaping Objects":, issued Messrs. Hirsch, Jordan, and Lesem on Sept. 20, 1971.

SUMMARY OF THE INVENTION

The multiemulsion on-axis computer generated hologram is a single transparency having at least two emulsion layers in which one layer controls the transmittance of light by attenuation and the other layer controls the phase of the light by phase shifting the light as it passes through. One emulsion has a selectively variable optical density of transmittance and another emulsion has a selectively variable material thickness and/or refractive index to selectively slow down the light passing therethrough. The hologram is made from a color sensitive photographic film wherein each layer of the film is an emulsion that is selectively photosensitive to light of a different color. In making a hologram according to the present invention, the film is first exposed to an illumination pattern of a representation of Fourier transformed amplitude data using light having a spectrum to which one of the layers is selectively sensitive, and then is exposed to an illumination pattern of a representation of Fourier transformed phase data using light having a spectrum to which one or more of the other layers is selectively sensitive. The two patterns of data are displayed sequentially with a computer controlled cathode-ray tube and two separate exposures of the film are made thereby encoding the two patterns of data separately into the two layers of emulsion. After the film is developed into a transparency, the hologram is reconstructed by illuminating the transparency with coherent light such that the light is selectively absorbed in a proper amount in accordance with the recorded Fourier transformed amplitude data and the phase of the light is selectively shifted in accordance with the recorded Fourier transformed phase data. The image is reconstructed on the transmission axis of the reconstructing beam of light.

In an additional embodiment of the present invention the layer of emulsion controlling the phase is compensated for phase shifts occuring in the layer of the emulsion controlling the amplitude transmittance. This compensation is achieved by adding complementary phase shifting data to the phase controlling layer of the transparency to cancel out the phase shifts occuring in the amplitude controlling layer.

It is an object of the present invention to provide a novel method, apparatus, and holographic product which overcomes the limitations and disadvantages of the prior art.

A further object of the present invention is to synthesize a holographic transparency that controls both the amplitude and the phase of a beam of reconstructing light at each point on the surface of the transparency.

Another object of the present invention is to minimize the number of resolution elements required to encode each Fourier coefficient. In making a hologram according to the present invention each resolution element on a visual display device can encode one coefficient onto the film. This invention requires no redundancy in order to achieve an image having good fidelity.

Another object of the present invention is maximizing the amount of light from the reconstructing beam that goes into forming a useful image. The hologram of the present invention forms a holographic image on the axis of the light transmission and does not generate spurious images on-axis or in the higher diffraction orders. In addition, there is no light diffracted from the hologram into unusable, spurious images.

Another object of the present invention is the faithful reproduction obtained of the object. The hologram of the present invention has no quantization noise or fidelity loss because the data describing the image of the object is neither discarded nor quantized.

Additional objects and features of the invention will appear from the following description in which the preferred embodiments have been set forth in detail in conjunction with the accompanying drawings.

DESCRIPTION OF THE PREFERRED EMBODIMENTS

Figure 1:
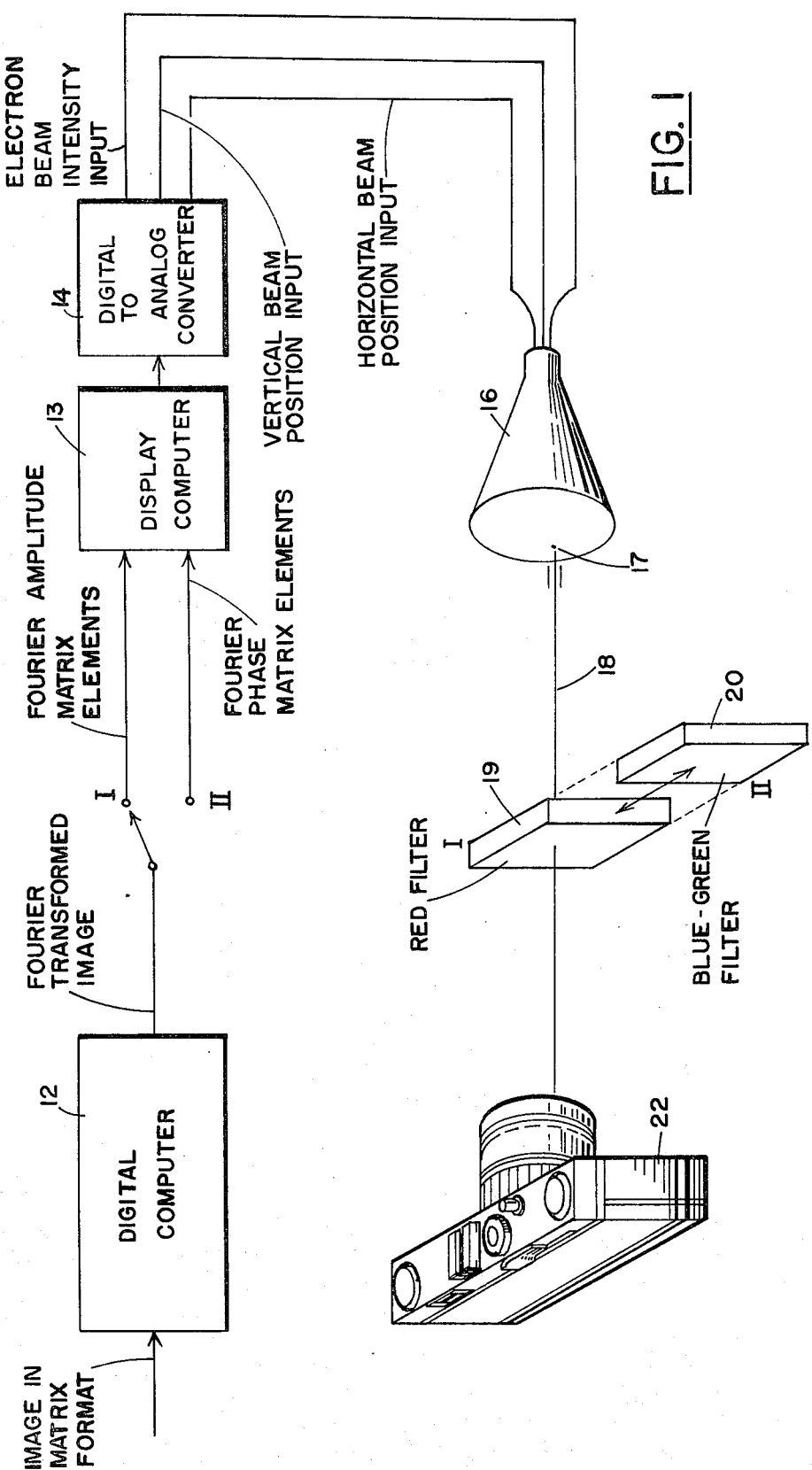
FIG. 1 is a block diagram of the present invention illustrating the steps in making a multiemulsion on-axis computer generated hologram.

FIG. 1 illustrates the process for making a multiemulsion on-axis computer generated hologram according to the present invention. The process begins by first describing the image desired to be obtained from the hologram in the format of a matrix. The matrix representation used in an embodiment of the present invention that was actually constructed was a two dimensonal array of binary ones and zeros representing an array of phase coherent point sources that form the image. The image matrix is then Fourier transformed in a digital computer 12. In the preferred embodiment that actually was performed, an IBM 360/67 digital computer was used with a fast Fourier transform subroutine. The fast Fourier subroutine is explained in "Three Fortran Programs that perform the Cooley-Tukey Fourier Transform"; Technical Note 1967-2; July 28, 1967; Lincoln Laboratory, Mass. Institute of Technology. The digital computer 12 Fourier transforms the two dimensional image matrix into an array of complex Fourier coefficients according to the following equation: $Fmp = Amp \exp(i\theta mp)$. The Fourier amplitude and phase coefficients can be separated into two matrices, one containing the elements Amp which are non-negative real numbers, and the second with the elements $\theta mp$ which always lies between 0 and $2\pi$.

The digital computer 12 is connected to a display computer 13 and a conventional digital to analog converter 14. The digital to analog converter is connected in turn to a cathode-ray tube 16. The display computer 13 controls the position and intensity of the electron beam 17 of the cathode-ray tube through the digital to analog converter. The digital computer 12 selectively reads out two sets of information represented by Roman numerals I and II. When the digital computer 12 reads out the information represented by input I, the Fourier amplitude matrix elements Amp are transmitted to the display computer 13. When the digital computer 12 reads out the information represented by input II, the Fourier phase matrix elements $\theta mp$ are transmitted to the display computer 13. The display computer 13 converts these matrix elements into locations and durations of the electron beam spot 17 on the cathode-ray tube. The digital to analog converter generates from the binary output of the display computer an electron beam intensity order, a vertical position input, and a horizontal position input to the cathode-ray tube. Thus the representation of the Fourier transformed amplitude and phase elements computed by the digital computer 12 are displayed on the cathode-ray tube 16.

The scan of the cathode-ray tube 16 is photographed by a camera 22 using a conventional color reversal photographic film. The exposure of the film is controlled by the duration of time that the electron beam spends at each display element on the cathode-ray tube display. These are two exposures made for each frame of the film and each exposure is photographed through a different colored filter 19, 20. When the Fourier amplitude matrix elements, information input I, are read into the display computer 13, filter I 19 is placed in the light beam 18 from the cathode-ray tube 16. When the Fourier phase matrix elements, information input II, are read into the display computer, filter II 20 is placed in the beam 18.

The color reversal photographic film in the camera 22 contains several emulsion layers, each selectively photosensitive to light in a different region of the spectrum. In the embodiment of the present invention actually constructed, Kodachrome II color reversal film was utilized to form the transparency. Kodachrome II has in effect three layers of emulsion each individually sensitive to blue, green and red light. After processing, these emulsions form dye images on the transparency that are predominately blue absorbing (yellow), green absorbing (magenta), and red absorbing (cyan). When a color transparency such as Kodachrome II is illuminated by a carefully selected monochromatic light, the light is predominately attenuated in the film by just one of the three emulsions. The other two emulsions, while not attenuating the light, can modulate the phase of the transmitted light thorugh changes in the relief and the refractive index of the film. In other words, the other emulsions are essentially optically transparent to the selected monochromatic light.

The spectrum of each light exposing the film is controlled by the selection of the filters 19, 20 to occur in a region of the optical spectrum where each of the emulsions of the film is selectively photosensitive. When the Fourier amplitude matrix elements I are displayed on the cathode-ray tube 16, a red filter 19 is placed between the cathode-ray tube 16 and the camera 22. The exposure to red light is made such that the final amplitude transmittance of the transparency to red light is directly proportional to the desired Fourier amplitude. In one embodiment of the present invention that was made, the filter 19 was a Kodak Wratten 26 red filter and the entire linear dynamic range of the red-absorbing emulsion was used.

When the Fourier phase matrix elements II are displayed on the cathode-ray tube 16, a blue-green filter 22 is placed between the cathode-ray tube and the camera 22. The film is exposed by cyan light through the blue-green filter 20, and the exposure is chosen so that the optical density of the transparency to cyan light is linearly related to the log of the cyan exposure. In one embodiment that was made the filter 20 was a Kodak Wratten 38A filter.

The filters 19, 20 must also be selected with regard to the chromaticity of the phosphor of the cathode-ray tube. In the embodiment actually made, the Kodak Wratten filters 26 and 38A were used with a Tektronics Type 602 oscilloscope having a P31 phosphor.

In operation, the red filter 19 is first inserted between the cathode-ray tube 16 and the camera 22 and then the shutter of the camera 22 is opened. The display computer 13 is thereafter commanded to display a representation of the Fourier amplitude matrix pattern on the catode-ray tube. The display element 17 on the cathode-ray tube produces a light beam 18 that exposes the film. The exposure is controlled by the duration of time that the electron beam spends at each display element on the cathode ray tube display. The exposure is calculated such that the resultant amplitude transmittance of the transparency to red light is proportional to the computed Fourier transform amplitude. After the amplitude matrix has been exposed to the film, the red filter 19 is removed and the blue-green filter 20 is placed between the cathode-ray tube and camera. The film is not advanced in the camera between these exposures. The display computer is then commanded to display a representation of the Fourier phase matrix elements on the cathode-ray tube. The process of exposing the film to the phase elements is the same as the process of exposing the amplitude elements. The exposure is calculated to produce a photographic density through the transparency to blue-green light that linearly varies with the computed Fourier phase matrix, assuming phase transmittance varies linearly with photographic density. After the two Fourier transformed image patterns have been displayed on the cathode-ray tube, the shutter of the camera is closed completing the two exposures. Extreme care is taken not to move the camera between or during the exposures thereby destroying the registration.

The exposed film is conventionally processed in a commercial processing laboratory in accordance with the instructions of the film manufacturer for the type of color reversal film utilized.

Figure 2:
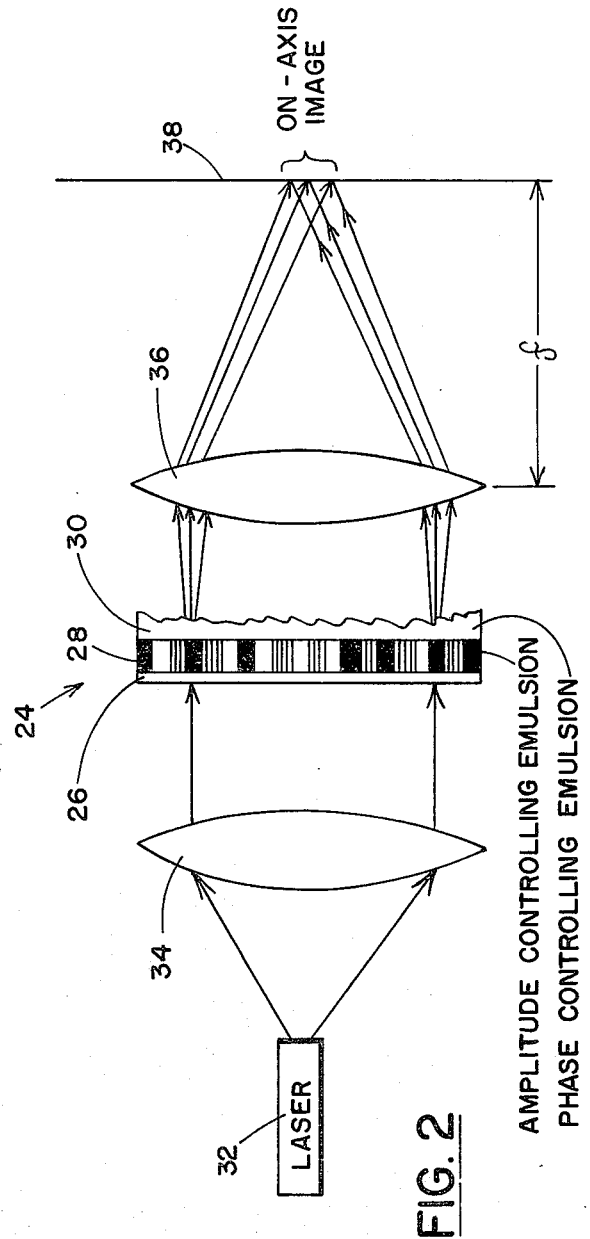
FIG. 2 is a diagramatic view of the present invention illustrating in cross section the hologram formed by the steps of FIG. 1 and the apparatus for reconstructing the image recorded thereon.

Referring to FIG. 2, reference numeral 24 generally indicates a Fourier transformed hologram according to the present invention. The hologram 24 is a conventional color reversal transparency exposed and processed in the manner described hereinbefore. Reference numeral 26 indicates the optically clear layer that supports the emulsions. The red absorbing emulsion that was exposed to the Fourier amplitude matrix element in red light was developed into an amplitude transmittance controlling emulsion 28. The amplitude transmittance is controlled by the emulsion 28 by varying the optical density of transmittance to a reconstructing light beam as hereinafter described. The blue and green absorbing emulsions that were exposed to the Fourier phase matrix elements in cyan light have been developed into a phase controlling emulsion 30. The phase of the reconstructing beam is controlled by the emulsion 30 by varying the optical path length through the emulsion. The reconstructing beam is phase shifted in accordance with the amount of emulsion presented to the beam as it travels along the axis of transmission.

The image recorded on the hologram 24 is reconstructed by a reconstructing light beam produced by a laser 32. In the embodiment actually constructed, a He-Ne laser producing coherent red light at 6328-Angstroms was used. The light beam from the laser 32 is expanded and directed onto the hologram 24 by a first positive lens 34. Within the transparency the coherent red light is attenuated by the red absorbing emulsion 28 and phase shifted by the blue and green absorbing emulsions 30. The light leaving the hologram 24 is focused by a second positive lens 36 on to a focal plane 38. The image is obtained on the focal plane and is centered about the axis of transmission of the reconstrucing beam.

Although a Fourier transformed hologram has been herein described and illustrated, it is contemplated that the present invention also includes the production of a Fresnel hologram. A Fresnel hologram according to the present invention forms an on-axis image at a location other than at the focal plane of the second lens 36. To make a Fresnel hologram, the digital computer 12 computes Fresnel transformed amplitude and phase matrix elements from the two dimensional image matrix hereinbefore described. The Fresnel matrix elements are similarly processed by the display computer 13 and sequentially expose the color reversal photographic film as hereinbefore described. The Fresnel hologram is reconstructed with coherent light in the manner illustrated in FIG. 2, and the image appears at a location displaced from the focal plane 38.

Since a Fresnel hologram can form an image without the need of a lens, the lens 36 may be eliminated and the image can be formed without the lens, but at a different distance from the hologram. Furthermore, the lens 36 may be eliminated for reconstruction of an image from a Fresnel hologram if the lens function is encoded into the hologram by adding the phase information of the lens to the phase information of the hologram.

Although a planar object and image has been herein described ind illustrated, it is contemplated that the present invention also includes the production of a hologram of a three-dimensional object. To make a hologram of a three-dimensional object, the object is described by a plurality of matrices, one matrix for each plane of the object described. From the object data the digital computer 12 computes the representation of the complex wavefront at the hologram plane generated by said three-dimensional object. The hologram matrix elements are similarly processed by the display computer 13 and sequentially expose the color reversal photographic film as herein described. The hologram of a three-dimensional object is reconstructed with coherent light as herein before described.

Figure 3:
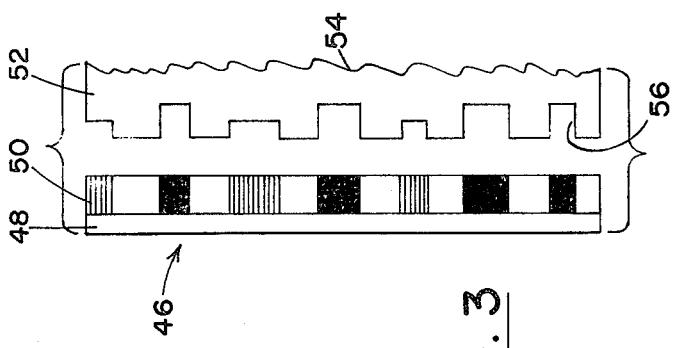
FIG. 3 is a diagramatic view in cross section illustrating a hologram according to an additional embodiment of the present invention with a phase compensation correction for phase shifts occuring in the amplitude controlling layer applied to the phase controlling layer of the transparency.

Referring to FIG. 3, an additional embodiment of the present invention is illustrated. Reference numeral 46 indicates a Fourier transform hologram that is compensated for the relief and index changes and unwanted phase variations of the reconstructing light that are introduced by the amplitude controlling emulsion. The hologram 46 includes an optically clear layer 48 for mounting the photosensitive emulsions. The amplitude controlling emulsion 50 is exposed to the same Fourier transform amplitude matrix elements as hereinbefore described. The amplitude transmittance is controlled by the emulsion 50 by varying the optical density of transmittance to a reconstructing light beam. The phase controlling emulsion 52 is exposed to the same Fourier transform phase matrix elements hereinbefore described but the log of the cyan exposure at each point is reduced by an amount proportional to the log of the red exposure at that point. The proportionality constant between the two loagrithms of the exposure is determined experimentally.

In FIG. 3 the phase controlling emulsion 52 is illustrated as further including a compensating margin 56 as well as a Fourier phase controlling margin 54. The compensation margin 56 is shown as having a varying optical length corresponding to the varying optical density of transmittance of the amplitude controlling emulsion 50. It should be appreciated that on a hologram according to this additional embodiment the phase controlling layer 52 is not physically separated from the amplitude controlling layer 50, and the interfacing surfaces between these two layers are actually substantially coincident. The compensation illustrated in the compensating margin 56 is actually combined with the margin 54 and appears there.

Figure 4:
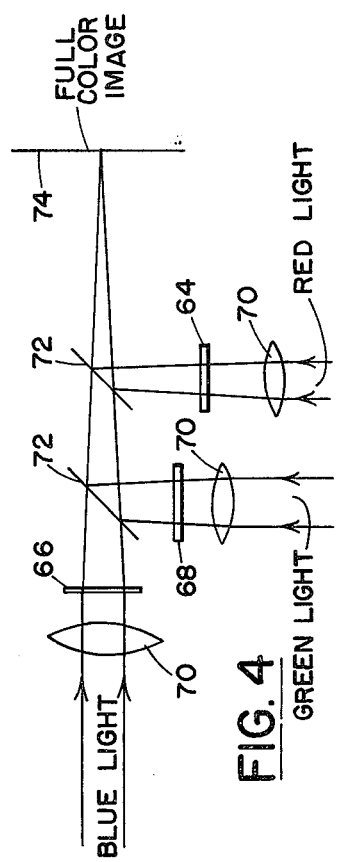
FIG. 4 is a diagramatic view of a plurality of holograms formed by the steps of FIG. 1 according to the present invention, each hologram being illuminated by a primary color to obtain a full color image.

Referring to FIG. 4, the multiemulsion hologram of the present invention can be used to construct a final image in full color. The full color image is initially divided into three component images formed by the combination of the three primary colors, red, blue, and green. A Fourier transformed hologram 64 capable of being reconstructed with a coherent red light is exposed and processed as described hereinbefore. The Fourier amplitude and phase data are taken from the red component image. A hologram 66 capable of being reconstructed with coherent blue light and a hologram 68 capable of being reconstructed with coherent green light are also constructed. For the blue colored component image, the hologram 66 is exposed to the Fourier amplitude data in blue light and Fourier phase data in red-green light. For the green colored component image, the hologram 68 is exposed to the Fourier amplitude data in green light and Fourier phase data in red-blue light. All three holograms are conventionally processed. To reconstruct the full color image, the red, green and blue controlling holograms 64, 68, 66 are respectively illuminated with red, green and blue coherent light that is focused by a plurality of first lenses 70. The component images from the three holograms are combined together using two beam splitters 72 and three component images combine to form a composite full color image on a focal plane 74. The holograms are placed with respect to the focal plane 74 so that the three images are appropriately scaled in accordance with the wave length of the illumination passing therethrough.

It is also contemplated to be within the scope of this invention to make a hologram without using the digital computer 12 and Fourier transforming an original image. The two sets of holographic data can be inserted directly into the display computer 13 and displayed in sequence on the cathode-ray tube 16. Typically, such amplitude and phase data is obtainable from an acoustic microscope. The exposure, processing, and reconstruction of the hologram is the same as described hereinbefore.

It is also contemplated to be within the scope of this invention to make a hologram having a complex transmittance that is not ncessarily the transform of a specific image. The hologram, according to the present invention can encode a complex function of a general nature. In addition to storing data for image formation, the hologram can be equally well used as an optical element (such as an apodized lens or an aperture) or as a component in an optical data processing system. Two sets of holographic data, representing the amplitude and phase of a general complex function, can be inserted directly into the display computer 13 and displayed in sequence on the cathode-ray tube 16. The exposure and processing of the hologram is the same as described hereinbefore, and the manner in which the processed transparency is illuminated depends upon the intended use of the hologram.

Although the best mode contemplated for carrying out the present invention has been herein shown and described, it will be apparent that modification and variation may be made without departing from what is regarded to be the subject matter of the invention.

We claim:

1. A method of synthesizing a multiemulsion transparency for producing an image of an object with a constructing beam of light, comprising the steps of: determining in matrix format the image of the object;

Fourier transforming the image matrix into two transmittance matrices, one matrix having amplitude transmittance elements and the other matrix having phase transmittance elements; exposing a color reversal, multiemulsion photographic film to a representation of the amplitude elements with a first light having a spectrum to which only a first emulsion of the film is photosensitive; exposing the film to a representation of the phase elements with a second light having a spectrum to which only a second emulsion of the film is photosensitive; and processing the film into a transparency.

2. The method of claim 1 wherein the steps of exposing each emulsion further includes the step of timing the exposure of the amplitude and phase transmittance elements to the film so that the beam of light is attenuated in the first emulsion and phase shifted in the second emulsion in accordance with the respective transmittance elements.

3. The method of claim 2 further including the step of compensating the second emulsion for phase shifts occuring to the beam of light in the first emulsion.

4. A method of synthesizing a multiemulsion transparency for producing a component image capable of being reconstructed with other component images to produce a full color image, comprising the steps of: forming a component image constructable by a primary colored coherent light, said component image being combinable with component images of the other primary colors to form the full color image; describing the component image of the object in matrix format; Fourier transforming the image matrix into two transmittance matrices, one matrix having amplitude transmittance elements and the other matrix having phase transmittance elements; exposing a color reversal, multiemulsion photographic film to a representation of the Fourier transformed amplitude elements with a first light having a spectrum to which one emulsion of the film is photosensitive; exposing the film to representation of the Fourier transformed phase elements with a second light having a spectrum to which another emulsion of the film is photosensitive and processing the film into a transparency.

5. Apparatus for making a multiemulsion transparency for optically constructing a wave front with a constructing beam of light using a matrix of amplitude transmittance data and a matrix of phase transmittance data describing the wave front, comprising: means for displaying a representation of the two matrices sequentially on an optical display device; means for exposing a color reversal, multiemulsion, photographic film to the representation of the matrix of amplitude transmittance data on the display device with a light having a spectrum to which only a first emulsion of the film is photosensitive and means for exposing said photographic film to the representation of the matrix of phase transmittance data on the display device with light having a spectrum to which only a second emulsion of the film is photosensitive.

6. The apparatus of claim 5 wherein the matrix of amplitude transmittance data exposing means includes a first light filtering means disposed between said optical display device and said film and the matrix of amplitude transmittance data exposing means includes a second light filtering means disposed between said optical display device and said film.

7. The apparatus of claim 6 further including camera means for retaining said film while displaying the representation of the two matrices of data.

8. Apparatus for synthesizing a multiemulsion transparency for optically constructing an image, comprising: means for Fourier transforming a mathematical representation of the image into two transmittance matrices, one matrix having amplitude transmittance elements and the other matrix having phase transmittance elements and means for exposing a color reversal, multiemulsion photographic film to the representation of the matrix having amplitude transmittance elements with a light having a spectrum to which only a first emulsion of the film is photosensitive and means for exposing said photographic film to the representation of the matrix having phase transmittance element elements with a light having a spectrum to which only a second emulsion of the film is photosensitive.

9. A multiemulsion transparency for optically modulating a wave front by absorbing and phase shifting a beam of substantially monochromatic light passing therethrough, said modulation being describable by a complex transmittance function $F(u,v)=A(u,v)\exp[j\phi(u,v)]$ that is a combination of an amplitude function $A(u,v)$ and a phase function $\phi(u,v)$, comprising:

an amplitude transmittance controlling emulsion for attenuating the beam of substantially monochromatic light, the amplitude controlling emulsion having areas thereon of differing amplitude transmittance which correspond to the amplitude function $A(u,v)$ and said emulsion exclusively attenuates the beam of light in accordance with said amplitude function; and an independent phase shifting emulsion attached thereto for slowing down the beam of light passing therethrough, the phase controlling emulsion having areas thereon of differing phase shift which correspond to the phase function $\phi(u,v)$ and the values of the phase shift in said phase controlling areas vary in a continuous manner over a range of 0 to $2\pi$ radians of phase delay and the constructed wave front propagating on the axis of propagation of the light beam and said emulsion phase shifts the beam of light in accordance with said phase function.

10. The transparency of claim 9 wherein the amplitude controlling emulsion of said transparency is photographically produced by exposure to a first beam of light having an illumination pattern corresponding to the amplitude function $A(u,v)$ and having a spectrum to which only said emulsion is sensitive and wherein the phase controlling emulsion is photographically produced by a second beam of light having an illumination pattern corresponding to the phase function $\phi(u,v)$ and having a spectrum to which only said second phase controlling emulsion is sensitive.

11. The transparency of claim 10 wherein the transparency is color reversal photographic film.

12. The transparency of claim 10 wherein the differing phase shifts of the areas of the phase controlling emulsion, in addition to corresponding to the phase function $\phi(u,v)$, compensate for phase shifts to the beam of light caused by the amplitude controlling emulsion.

13. A multiemulsion transparency for optically constructing an image by absorbing and phase shifting a beam of substantially monochromatic light passing therethrough, said constructed image being describable by a complex mathematical function $f(x,y)$ that has Fourier transform $F(u,v)=A(u,v)\exp[j\phi(u,v)]$ that is a combination of an amplitude function $A(u,v)$ and a phase function $\phi(u,v)$, comprising:

an amplitude transmittance controlling emulsion for attenuating the beam of substantially monochromatic light, the amplitude controlling emulsion having areas thereon of differing amplitude transmittance which correspond to the amplitude function $A(u,v)$ and said emulsion exclusively attenuates the beam of light in accordance with said amplitude function; and an independent phase shifting emulsion attached thereto for slowing down the beam of light passing therethrough, the phase controlling emulsion having areas thereon of differing phase shift which correspond to the phase function $\phi(u,v)$ and the values of the phase shift in said phase controlling areas vary in a continuous manner over a range of 0 to $2\pi$ radius of phase delay and the constructed wave front propagating on the axis of propagation of the light beam and said emulsion phase shifts the beam of light in accordance with said phase function.

14. The transparency of claim 13 wherein the amplitude controlling emulsion of said transparency is photographically produced by exposure to a first beam of light having an illumination pattern corresponding to the amplitude function $A(u,v)$ and having a spectrum to which only said emulsion is sensitive and wherein the phase controlling emulsion is photographically produced by a second beam of light having an illumination pattern corresponding to the phase function $\phi(u,v)$ and having a spectrum to which only said second phase controlling emulsion is sensitive.

15. The transparency of claim 14 wherein the transparency is color reversal photographic film.

16. The transparency of claim 14 wherein the differing phase shifts of the areas of the phase controlling emulsion, in addition to corresponding to the phase function $\phi(u,v)$ compensate for phase shifts to the beam of light caused by the amplitude controlling emulsion.

17. A multiemulsion transparency for optically constructing an image by absorbing and phase shifting a beam of substantially monochromatic light passing therethrough, said constructed image being describable by a complex mathematical function $f(x,y)$ that has Fresnel transform $F(u,v)=A(u,v) \exp[j\phi(u,v)]$ that is a combination of an amplitude function $A(u,v)$ and a phase function $\phi(u,v)$, comprising:

an amplitude transmittance controlling emulsion for attenuating the beam of substantially monochromatic light, the amplitude controlling emulsion having areas thereon of differing amplitude transmittance which correspond to the amplitude function $A(u,v)$ and said amulsion exclusively attenuates the beam of light in accordance with said amplitude function; and an independent phase shifting emulsion attached thereto for slowing down the beam of light passing therethrough, the phase controlling emulsion having areas thereon of differing phase shift which correspond to the phase function $\phi(u,v)$ and the values of the phase shift in said phase controlling areas vary in a continuous manner over a range of 0 to $2\pi$ radius of phase delay and the constructed wave front propagating on the axis of propagation of the light beam and said emulsion phase shifts the beam of light in accordance with said phase function.

18. The transparency of claim 17 wherein the amplitude controlling emulsion of said transparency is photographically produced by exposure to a first beam of light having an illumination pattern corresponding to the amplitude function $A(u,v)$ and having a spectrum to which only said emulsion is sensitive and wherein the phase controlling emulsion is photographically produced by a second beam of light having an illumination pattern corresponding to the phase function $\phi(u,v)$ and having a spectrum to which only said second phase controlling emulsion is sensitive.

19. The transparency of claim 18 wherein the transparency is color reversal photographic film.

20. The transparency of claim 18 wherein the differing phase shifts of the areas of the phase controlling emulsion, in addition to corresponding to the phase function $\phi(u,v)$, compensate for phase shifts to the beam of light caused by the amplitude controlling emulsion.

21. A method of making a multiemulsion transparency for optically modulating a wave front, said modulation being describable by a complex transmittance function $F(u,v)=A(u,v)\exp[j\phi(u,v)]$ that is a combination of an amplitude function $A(u,v)$ and a phase function $\phi(u,v)$ comprising the steps of:

displaying two sets of data sequentially on an optical display device, said first set of data corresponding to the amplitude function $A(u,v)$ and a second set of data corresponding to the phase function $\phi(u,v)$;

exposing multiemulsion color photographic film to the first set of data on the display device wiht a light having a spectrum to whcih only a first emulsion of the film is photosensitive so that the first emulsion, after processing, has areas of differing amplitude transmittance that attenuates a beam of substantially monochromatic light in correspondence with the first set of data;

exposing said photographic film to the second set of data on the display device with a light having a spectrum to which a second emulsion of the film is photosensitive so that the second emulsion has areas of differing phase shift that slow down the beam of light passing therethrough in correspondence with the second set of data; and processing the photographic film into a transparency.

22. The method of claim 21 further including the steps of:

determining the phase shift of the light in the first emulsion caused by the areas of differing amplitude transmittance therein; and compensating the second set of data for said phase shift in the first emulsion.

23. The method of claim 21 wherein the complex transmittance function $F(u,v)=A(u,v) \exp[j\phi(u,v)]$ is the Fourier transform of a complex mathematical function $f(x,y)$ that describes an image.

24. The method of claim 21 wherein the complex transmittance function $F(u,v)=A(u,v) \exp[j\phi(u,v)]$ is the Fresnel transform of a complex mathematical function $f(x,y)$ that describes an image.

25. The method of claim 21 wherein the step of exposing the film to the first set of data includes the step of controlling the exposure of the film to the light so that the transparency has an amplitude transmittance to the beam of light proportional to the amplitude function $A(u,v)$.

26. The method of claim 21 wherein the step of exposing the film to the second set of data includes the step of controlling the exposure of the film to the light so that the transparency phase shifts a beam of light linearly with the phase function $\phi(u,v)$.

27. The method of claim 1 further including the steps of:

determining the phase shift of the constructing beam of light in the emulsion to which the amplitude elements are exposed; and compensating the matrix having phase transmittance elements for said phase shift.

* * * * *